(12) United States Patent
Jones

(10) Patent No.: US 10,939,665 B1
(45) Date of Patent: Mar. 9, 2021

(54) ELECTRONIC EAR TAG

(71) Applicant: Andy Doyle Jones, Edmond, OK (US)

(72) Inventor: Andy Doyle Jones, Edmond, OK (US)

( * ) Notice: Subject to any disclaimer, the term of this patent is extended or adjusted under 35 U.S.C. 154(b) by 0 days.

(21) Appl. No.: 16/815,280

(22) Filed: Mar. 11, 2020

Related U.S. Application Data

(63) Continuation-in-part of application No. 16/727,736, filed on Dec. 26, 2019.
(Continued)

(51) Int. Cl.
*A01K 11/00* (2006.01)
*G01S 19/14* (2010.01)
(Continued)

(52) U.S. Cl.
CPC ............ *A01K 11/004* (2013.01); *G01S 19/14* (2013.01); *H02J 7/35* (2013.01); *H04B 1/02* (2013.01)

(58) Field of Classification Search
CPC .... A01K 11/00; A01K 11/004; A01K 11/001; A01K 11/006; A01K 11/008; A01K 29/00; A01K 29/005; H02J 7/35; H04B 1/02; H04B 1/3827; H04B 1/3883; H04B 1/3888; H04B 2001/3894; H04B 1/40; H04B 1/401; H04B 1/44; H04B 1/03; H04B 1/04; H04B 1/06; H04B 1/16; H04B 1/1615; G01S 19/14; G01S 1/022; G01S 1/024; G01S 1/026; G01S 1/04; G01S 19/16; G01S 19/24; G01S 19/31; G01S 19/32; G01S 19/33; G01S 19/40; G01S 19/41; G01S 1/00; G01S 1/02; Y10S 370/912;
(Continued)

(56) References Cited

U.S. PATENT DOCUMENTS

2005/0145187 A1* 7/2005 Gray ............................. 119/174
2009/0241840 A1* 10/2009 Mills ........................... 119/51.02
(Continued)

FOREIGN PATENT DOCUMENTS

CN 204032048 12/2014
CN 204860518 U 12/2015
(Continued)

OTHER PUBLICATIONS

"Solar GPS Tracker", https://pl.aliexpress.com/item/32907891576.html.

*Primary Examiner* — Meless N Zewdu

(57) ABSTRACT

An electronic ear tag allows an individual to track a herd animal. Further, the electronic ear tag is an ultra-low power, and lightweight tag that runs only when needed. The electronic ear tag includes a substrate, a microcontroller, a rechargeable battery, a wireless communication module, a global positioning system (GPS) module, and a solar panel. The substrate is a circuit board used to support the electronic components of the present invention. The microcontroller is used to manage and control the electronic components of the electronic ear tag. The rechargeable battery is the main power source of the electronic ear tag. The wireless communication module allows the electronic ear tag to communicate with a central network. The GPS module allows the electronic ear tag to communicate with a GPS satellite. The solar panel converts solar energy into electrical energy used to charge the rechargeable battery.

12 Claims, 8 Drawing Sheets

Related U.S. Application Data

(60) Provisional application No. 62/896,985, filed on Sep. 6, 2019.

(51) Int. Cl.
*H04B 1/02* (2006.01)
*H02J 7/35* (2006.01)

(58) Field of Classification Search
CPC ............... Y10S 370/913; Y10S 385/90; Y10S 385/901; H04L 2209/80; H04L 2209/805; G06K 7/10237; G06K 7/10099; G06K 19/07; G06K 19/0723; H04W 4/185; H04W 12/00407; H04W 12/1004; H04W 4/70; H04W 4/80; H04W 4/30; H04W 4/029; H04W 4/02; H04W 4/022; H04W 4/021; H04W 4/025; H04W 12/00503; H04W 12/1206; H04W 88/00; H04W 88/16; H04W 88/08; H04W 88/02; H04W 88/021; H04W 92/00; H04W 92/08; H04W 52/00; H04W 52/02; H04W 52/0209; H04W 52/0235; H04W 52/0261; H04W 40/005; H04W 40/20; H04M 10/44; H04M 10/46; H04M 10/465; H04M 10/425; H04M 10/4271; H04M 10/4278; G01N 2201/0693
See application file for complete search history.

(56) References Cited

U.S. PATENT DOCUMENTS

| | | |
|---|---|---|
| 2012/0201277 A1* | 8/2012 | Tanner et al. .................. 375/141 |
| 2012/0326874 A1* | 12/2012 | Kwak et al. ................ 340/573.3 |
| 2013/0340305 A1 | 12/2013 | Mobley |
| 2014/0333439 A1* | 11/2014 | Downing et al. .... A01K 29/005 |
| 2017/0293782 A1* | 10/2017 | Thuss et al. ........ G06K 7/10366 |
| 2018/0132449 A1* | 5/2018 | Auer ..................... A01K 11/004 |
| 2019/0050926 A1* | 2/2019 | Cooper .............. G06Q 30/0623 |
| 2019/0289821 A1* | 9/2019 | Martinez-Barreiro et al. ............. A01K 1/008 |
| 2020/0323170 A1* | 10/2020 | Garigan et al. ...... A01K 11/004 |

FOREIGN PATENT DOCUMENTS

| | | | |
|---|---|---|---|
| EP | 3 593 634 A1 * | 1/2020 | ............ A01K 11/00 |
| JP | 003721250 B2 * | 11/2005 | |

\* cited by examiner

ELECTRONIC EAR TAG

The current application is a continuation-in-part (CIP) application of a U.S. non-provisional application Ser. No. 16/727,736 filed on Dec. 26, 2019. The U.S. non-provisional application Ser. No. 16/727,736 claims a priority to a U.S. provisional application Ser. No. 62/896,985 filed on Sep. 6, 2019.

The current application also claims a priority to the U.S. Provisional Patent application Ser. No. 62/896,985 filed on Sep. 6, 2019.

FIELD OF THE INVENTION

The present invention pertains primarily to the field of animal husbandry and more specifically to the electronic tagging and tracking of herd animals. The present invention consists of an electronic ear tag that monitors the position of the animal to which it is attached via a satellite positioning system and relays the data via a built-in Ultra-High Frequency (UHF) LoRaWAN radio system to any nearby LoRaWAN gateway and is thereby transmitted over the internet to servers for processing and display.

BACKGROUND OF THE INVENTION

The present invention relates to an ultrahigh-frequency animal electronic ear tag, which facilitates the placement of a GPS (Global Positioning System) positioning tag on the body of an animal. The specific technical scheme is that the ultrahigh-frequency animal electronic ear tag comprises a tag body, the GPS positioning chip, a rechargeable battery and a plastic casing, wherein the plastic casing is arranged on the upper surface and the lower surface of the GPS positioning chip and the GPS positioning chip is fixed in the tag body. Since the tag body protects the GPS positioning chip, the GPS positioning chip is prevented from being damaged by external force, sunlight, water, etc. There is a theft-prevention wire that runs around the tag fastener hole that prevents theft and notifies if the tag is removed. The tag is fastened in order to achieve maximum GPS Antennae transmission. The ear tag is powered by a battery and is trickle charged via a solar panel.

The LoRa-WAN gateway is fixed to a tower network which will be managed and deployed by a team. The towers will contain LoRa-WAN gateways for transmission and receiving electronic tag information, cellular and satellite backhaul, long range WiFi for linking towers and local WiFi. The local WiFi will be accessible to the user where towers are installed and there is no cellular signal or internet services. This local WiFi will provide access to locate tags in the field for which the tower is covering.

The cellular (3G, 4G, 5G, etc.) or satellite backhaul will receive data about the tags and this data will be used in a front-end web application, Android and iOS app. The user can also send data back to the tag. These short commands will include features such as reboot, blink LEDs, change mode and request historical data.

DETAIL DESCRIPTIONS OF THE INVENTION

Figure 1:
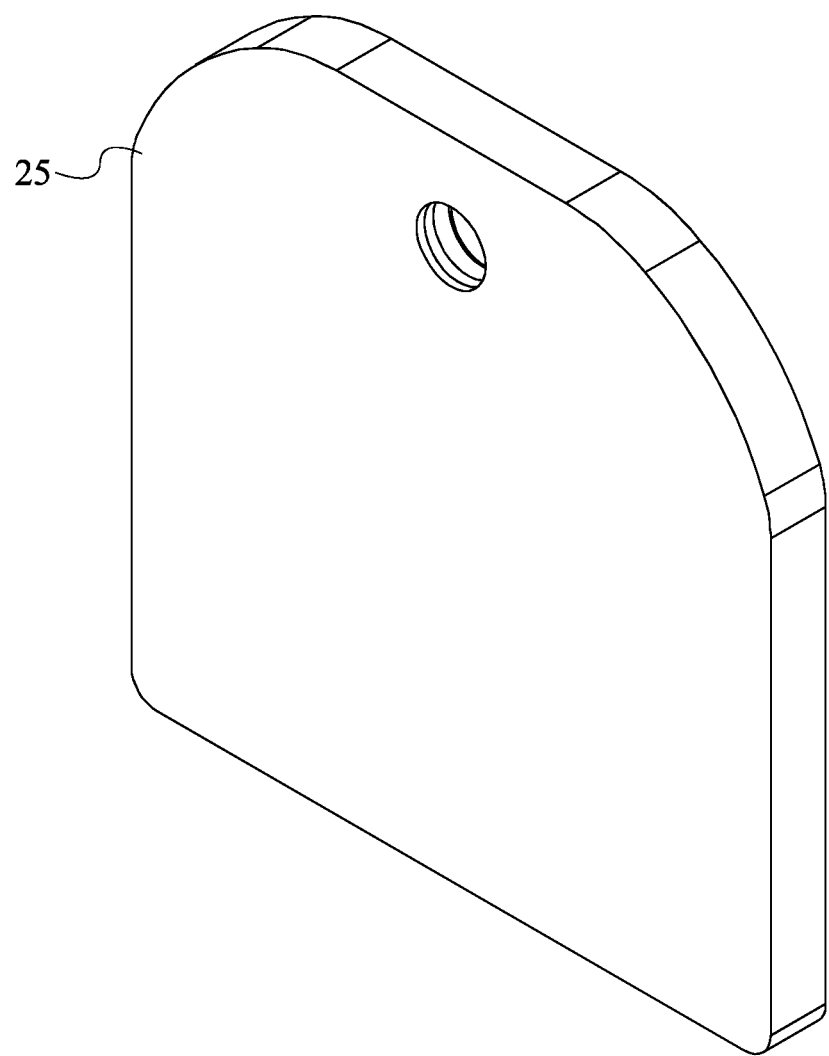
FIG. 1 is a front perspective view of the present invention.
Figure 2:
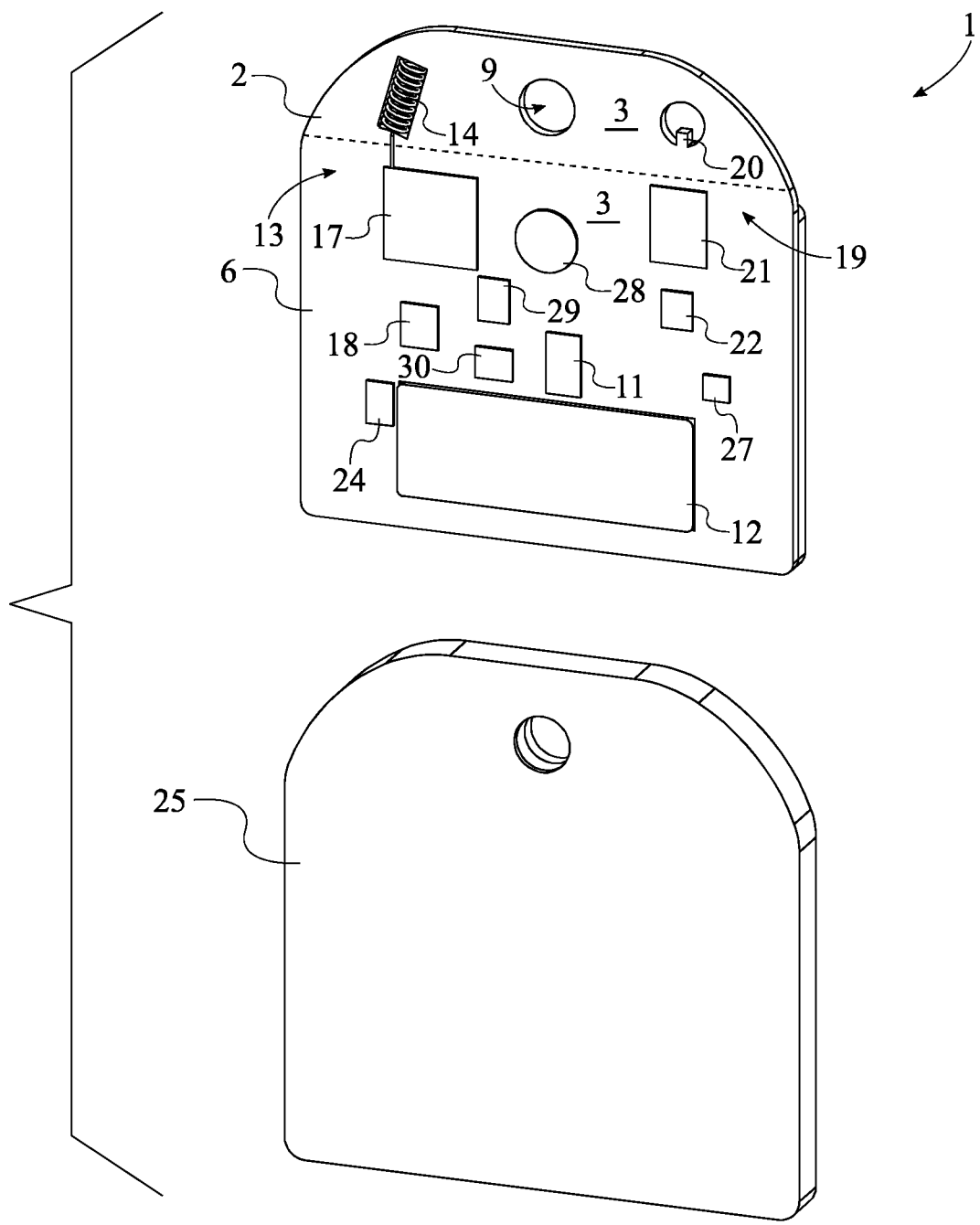
FIG. 2 is an exploded front perspective view of the present invention.
Figure 3:
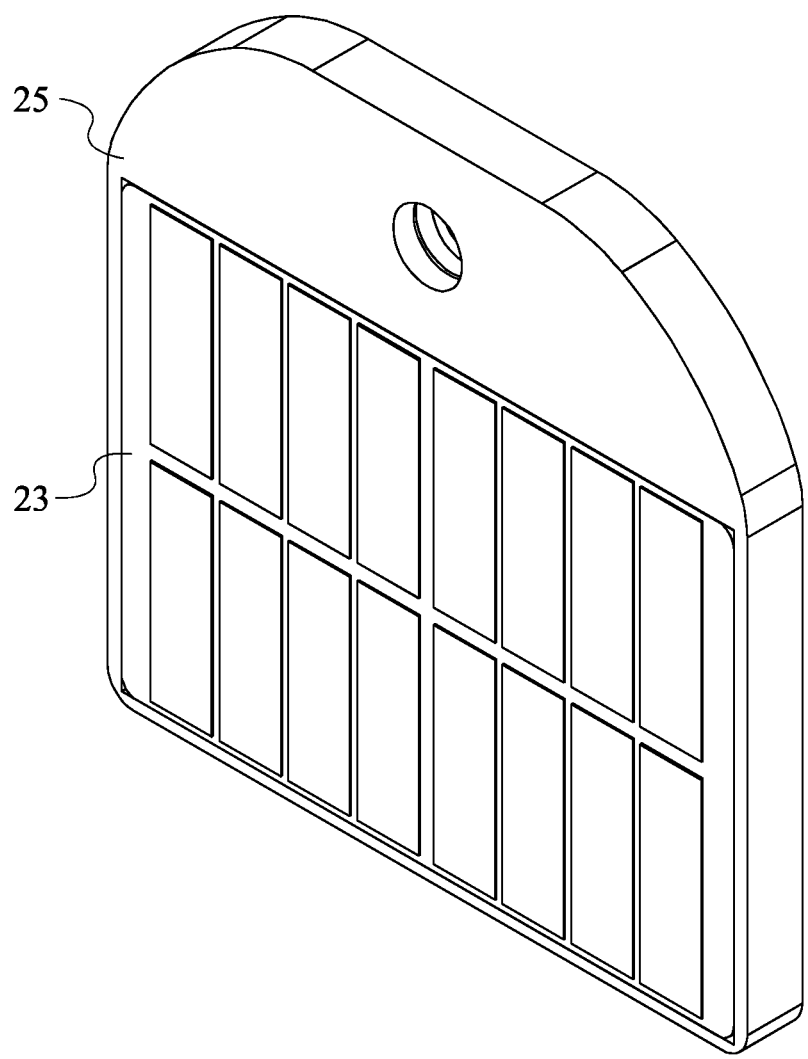
FIG. 3 is a rear perspective view of the present invention.
Figure 4:
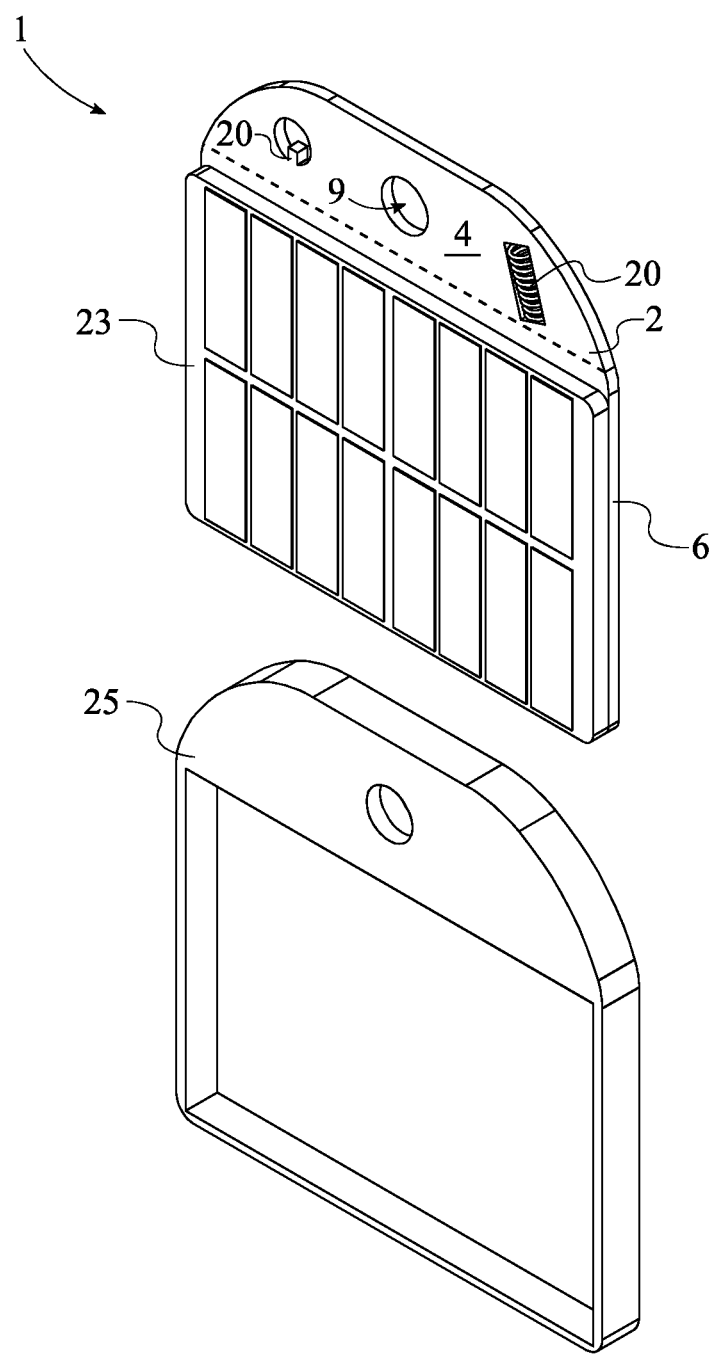
FIG. 4 is an exploded rear perspective view of the present invention.

All illustrations of the drawings are for the purpose of describing selected versions of the present invention and are not intended to limit the scope of the present invention.

In reference to FIGS. 1 through 8, the present invention is an electronic ear tag that allows an individual to track a herd animal. Further, the present invention is an ultra-low power, and lightweight tag that runs only when needed. The present invention comprises a substrate 1, a microcontroller 11, a rechargeable battery 12, a wireless communication module 13, a global positioning system (GPS) module 19, and a solar panel 23. The substrate 1 is a circuit board used to support the electronic components of the present invention. The microcontroller 11 is used to manage and control the electronic components of the present invention. The rechargeable battery 12 is the main power source of the present invention. The rechargeable battery 12 is preferably a lithium polymer battery that is shaped to maximize the battery yield and to distribute the weight of the present invention. The wireless communication module 13 is preferably a LoRaWAN radio module that allows the present invention to communicate with a central network such as, but not limited to, a LoRaWAN gateway. The GPS module 19 allows the present invention to communicate with a GPS satellite in order to determine the precise geographical location of the present invention. The solar panel 23 converts solar energy into electrical energy. This converted electrical energy is used to charge the rechargeable battery 12.

The general configuration of the aforementioned components allows an individual to track a herd animal through use of the present invention. With reference to FIGS. 2 through 5, the substrate 1 comprises a top flat portion 2, a bottom flat portion 6, and an ear-attachment feature 9. The ear-attachment feature 9 allows the present invention to be attached to the ear of a herd animal. The top flat portion 2 and the bottom flat portion 6 each comprise a first face 3 and a second face 4. The ear-attachment feature 9 is integrated into the top flat portion 2. In further detail, the ear-attachment feature 9 may be an aperture which traverses through the substrate 1. The rechargeable battery 12 is mounted into the first face 3 of the bottom flat portion 6. This arrangement positions the rechargeable battery 12 in order to efficiently power the electronic components of the present invention to weigh the present invention into hanging plumb from the ear of a herd animal. The microcontroller 11 is mounted onto the first face 3 of the bottom flat portion 6. This arrangement positions the microcontroller 11 near the rechargeable battery 12 in order to establish a low-power connection between the microcontroller 11 and the rechargeable battery 12. The wireless communication module 13 and the GPS module 19 are integrated into the substrate 1. This arrangement allows the substrate 1 to effectively support the wireless communication module 13 and the GPS module 19. The solar panel 23 is mounted onto the second face 4 of the bottom flat portion 6. This arrangement positions the solar panel 23 in order to receive the optimal solar energy. In further detail, this arrangement maximizes the surface area available for the solar panel 23 by allowing the solar panel 23 to span across the substrate 1 without physically intersection any other components of the present invention. Moreover and with reference to FIG. 7, the solar panel 23 is operatively coupled to the rechargeable battery 12 in order for solar panel 23 to recharge the rechargeable battery 12. In further detail, this arrangement allows the converted electrical energy from the solar panel 23 to be transferred to the rechargeable battery 12. The rechargeable battery 12 is electrically connected to the microcontroller 11, the wireless communication module 13, and the GPS module 19. Thus, the rechargeable battery 12 is used to power the microcontroller 11, the wireless communication module 13, and the GPS module 19. The microcontroller 11 is designed to be powered directly by the rechargeable battery 12. Thus, there is no need for the use of voltage regulators in order for the rechargeable battery 12 to directly power the microcontroller 11. Further and with reference to FIG. 8, the microcontroller 11 is electronically connected to the wireless communication module 13 and the GPS module 19. Thus, the microcontroller 11 is used to manage and control the wireless communication module 13 and the GPS module 19.

Figure 6:
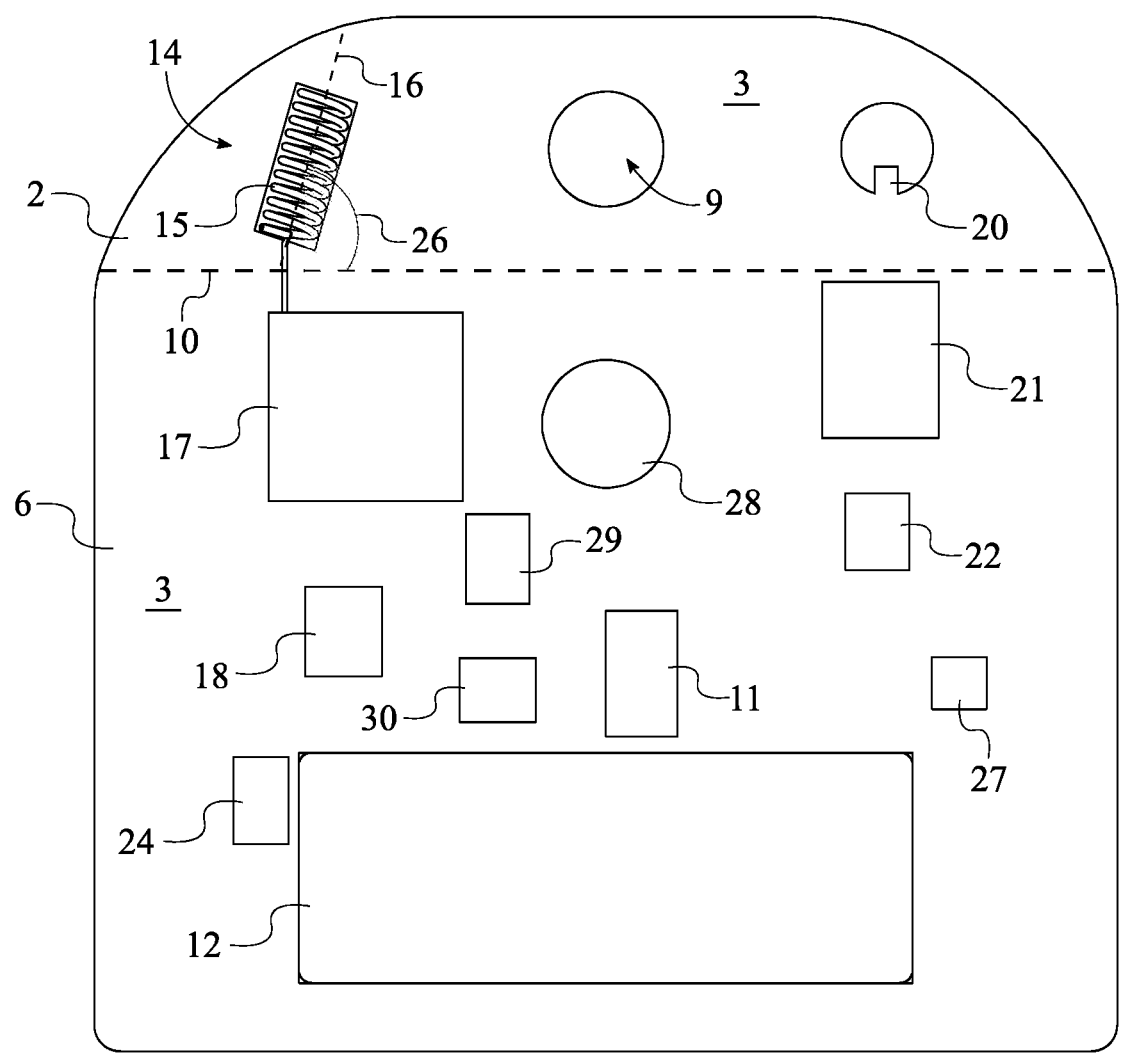
FIG. 6 is a front view of the present invention without the casing.
Figure 7:
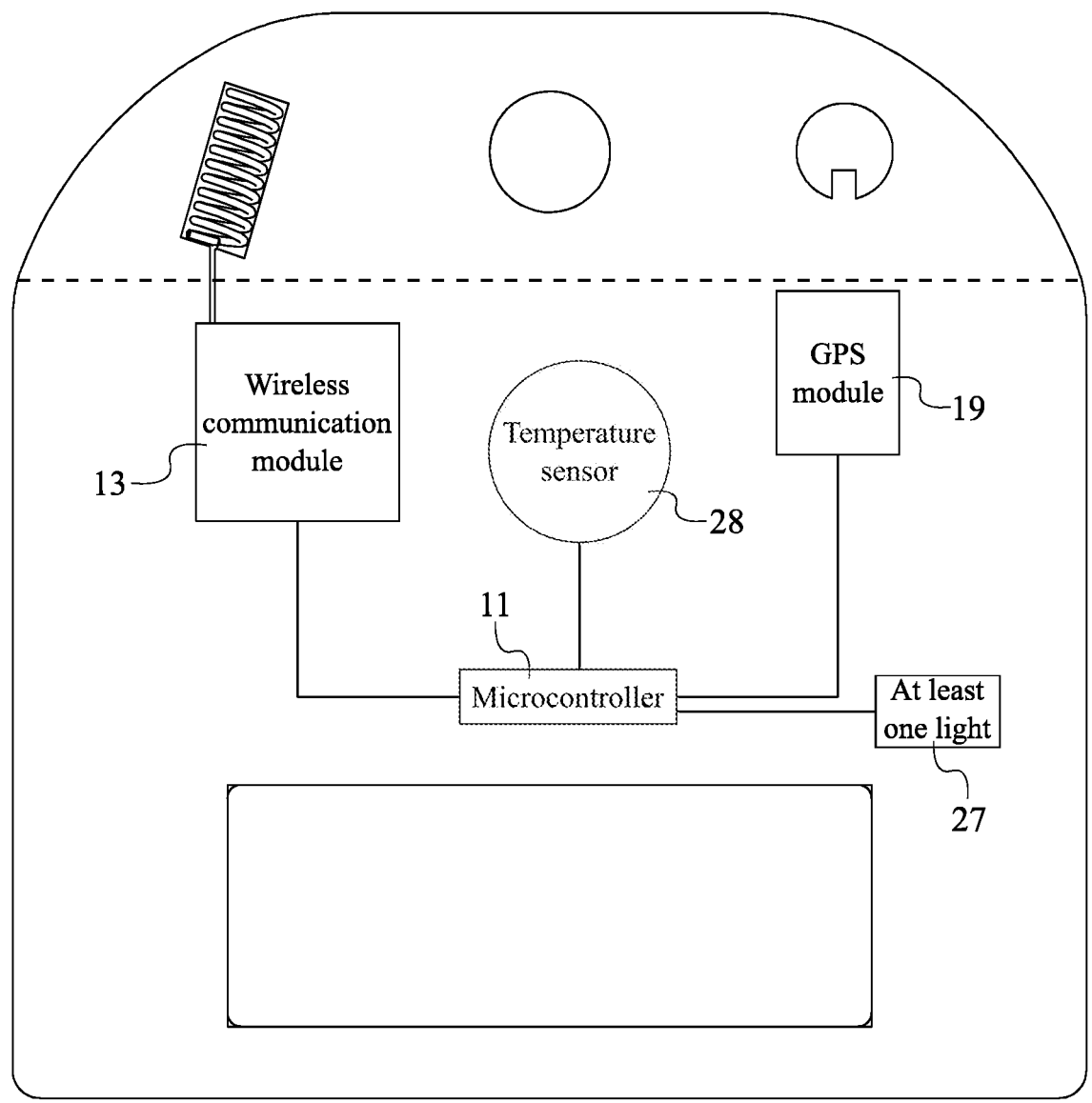
FIG. 7 is a schematic view illustrating the electrical connections of the present invention.

With reference to FIGS. 6 and 7, the present invention may further comprise a solar charge controller 24 in order to safely charge the rechargeable battery 12. The solar charge controller 24 is used to modify the current and/or voltage of the converted electrical energy in order to safely charge the rechargeable battery 12. The solar charge controller 24 is mounted to the first face 3 of the bottom flat portion 6. This arrangement positions the solar charge controller 24 near the solar panel 23 and the rechargeable battery 12 in order to easily transfer the converted electrical energy from the solar panel 23 to the rechargeable battery 12. Further, the solar panel 23 is electrically connected to the rechargeable battery 12 though the solar charge controller 24. Thus, the solar panel 23 can safely charge the rechargeable battery 12 through the solar charge controller 24.

With reference to FIGS. 1 through 4, the present invention may further comprise a casing 25 in order to protect and conceal the electronic components of the present invention. The substrate 1, the microcontroller 11, the rechargeable battery 12, the wireless communication module 13, and the GPS module 19 are positioned within the casing 25. Thus, the substrate 1, the microcontroller 11, the rechargeable battery 12, the wireless communication module 13, and the GPS module 19 are protected and concealed by the casing 25. The solar panel 23 is positioned external to the casing 25 in order for the solar panel 23 to effectively receive solar energy. Further, the casing 25 is hermetically connected around the solar panel 23 in order to be fully secured to the substrate 1. Moreover, the casing 25 is preferably made of a thermoplastic elastomer material in order to form a gasket around the solar panel 23.

Figure 8:
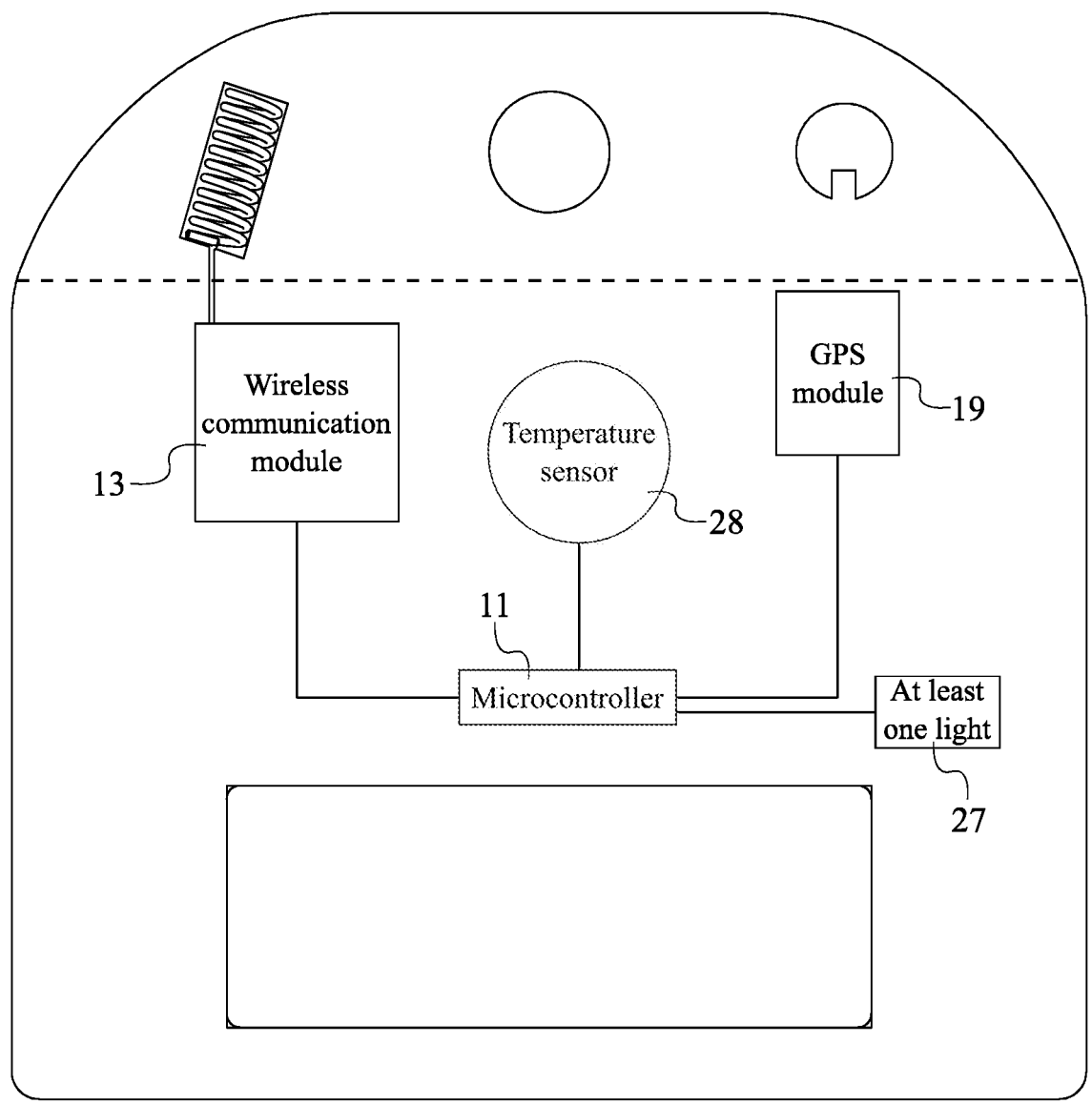
FIG. 8 is a schematic view illustrating the electronic connections of the present invention.

In order for the GPS module 19 to effectively communicate with a GPS satellite and with reference to FIGS. 6 through 8, the GPS module 19 may comprise a GPS antenna 20 and a GPS receiver 21. The GPS antenna 20 is used to amplify the signal sent by a GPS satellite. The GPS receiver 21 is used to receive the signal sent by a GPS satellite. The GPS antenna 20 is integrated into the top flat portion 2 in order to be oriented towards a GPS satellite. The GPS receiver 21 is mounted onto the first face 3 of the bottom flat portion 6 in order to be efficiently powered by the rechargeable battery 12. Moreover, the GPS module 19 may further comprise a GPS power switch 22. The GPS power switch 22 can be used to open or close the electrical connection between the GPS module 19 and the rechargeable battery 12. The GPS power switch 22 is mounted onto the first face 3 of the bottom flat portion 6. This arrangement positions the GPS power switch 22 near the GPS receiver 21 and the rechargeable battery 12. Further, the rechargeable battery 12 is electrically connected to the GPS receiver 21 through the GPS power switch 22. Thus, the electrical connection between the GPS receiver 21 and the rechargeable battery 12 can be opened or closed through the GPS power switch 22. In further detail, the GPS power switch 22 opens the electrical connection between the GPS receiver 21 and the rechargeable battery 12 in order to conserve energy when the present invention is not in use.

In order for the wireless communication module 13 to establish wireless communication between the present invention and a central network and with reference to FIGS. 6 through 8, the wireless communication module 13 may comprise a communication antenna 14 and a communication transmitter 17. The communication antenna 14 is used to amplify the signal sent by the wireless communication module 13. The communication transmitter 17 is used to send a signal to a central network such as, but not limited to, a LoRaWAN gateway. The communication antenna 14 is integrated into the top flat portion 2 in order to optimize the signal sent by the communication transmitter 17. The communication transmitter 17 is mounted onto the first face 3 of the bottom flat portion 6. This arrangement positions the communication transmitter 17 in order for the communication transmitter 17 to be efficiently powered by the rechargeable battery 12. Further, the communication transmitter 17 is positioned adjacent to the communication antenna 14 in order to minimize power loss between the communication antenna 14 and the communication transmitter 17. Moreover, the wireless communication module 13 may further comprise a communication power switch 18. The communication power switch 18 can be used to open or close the electrical connection between the wireless communication module 13 and the rechargeable battery 12. The communication power switch 18 is mounted onto the first face 3 of the bottom flat portion 6. This arrangement positions the communication power switch 18 near the communication transmitter 17 and the rechargeable battery 12. Further, the rechargeable battery 12 is electrically connected to the communication transmitter 17 through the communication power switch 18. Thus, the electrical connection between the communication transmitter 17 and the rechargeable battery 12 can be opened or closed through the communication power switch 18. In further, the communication power switch 18 may open the electrical connection between the wireless communication module 13 and the rechargeable battery 12 when the present invention is not in use to conserve energy. The communication antenna 14 comprises an elongated antenna body 15 which is oriented in a specific manner in order to establish optimal communication between the wireless communication module 13 and a central network. The central axis 16 of the elongated antenna body 15 is oriented at an acute angle 26 with a sagittal plane 10 of the substrate 1 in order to establish the optimal communication.

With reference to FIGS. 6 through 8, the present invention may further comprise at least one light 27 in order for an individual to track a herd animal in dark environments. The at least one light 27 is preferably an LED light. The at least one light 27 is mounted onto the first face 3 of the bottom flat portion 6. This arrangement positions the at least one light 27 near the rechargeable battery 12 in order to establish a low-power electrical connection. Further, the at least one light 27 is electrically connected to the rechargeable battery 12 and is electronically connected to the microcontroller 11. Thus, the rechargeable battery 12 is able to power the at least one light 27, and the microcontroller 11 is able to manage and control the at least one light 27.

With reference to FIGS. 6 and 8, the present invention may further comprise a temperature sensor 28 in order to measure the temperature of the electronic components of the present invention. The temperature sensor 28 is mounted onto the first face 3 of the bottom flat portion 6. This arrangement positions the temperature sensor 28 near the rechargeable battery 12 in order to establish a low-power electrical connection. Further, the temperature sensor 28 is electrically connected to the rechargeable battery 12 and is electronically connected to the microcontroller 11. Thus, the rechargeable battery 12 is able to power the temperature sensor 28 through the microcontroller 11, and the microcontroller 11 is able to receive temperature measurements from the temperature sensor 28.

With reference to FIGS. 6 and 7, the present invention may further comprise an initialization circuit 29 and an optical power switch 30, which are used to initialize the present invention only after the present invention is exposed to light. The initialization circuit 29 and the optical power switch 30 are mounted onto the first face 3 of the bottom flat portion 6. This arrangement positions the initialization circuit 29 and the optical power switch 30 near the rechargeable battery 12 in order to establish low-power connections. Further, the initialization circuit 29 is electrically connected to the rechargeable battery 12 through the optical power switch 30. Thus, the optical power switch 30 can open or close the electrical connection between the initialization circuit 29 and the rechargeable battery 12. In further detail, the electrical connection between the initialization circuit 29 and the rechargeable battery 12 is closed by the optical power switch 30 when the optical power switch 30 is exposed to light. This allows the power of the rechargeable battery 12 to be conserved until the present invention is unpackaged and ready to use.

Figure 5:
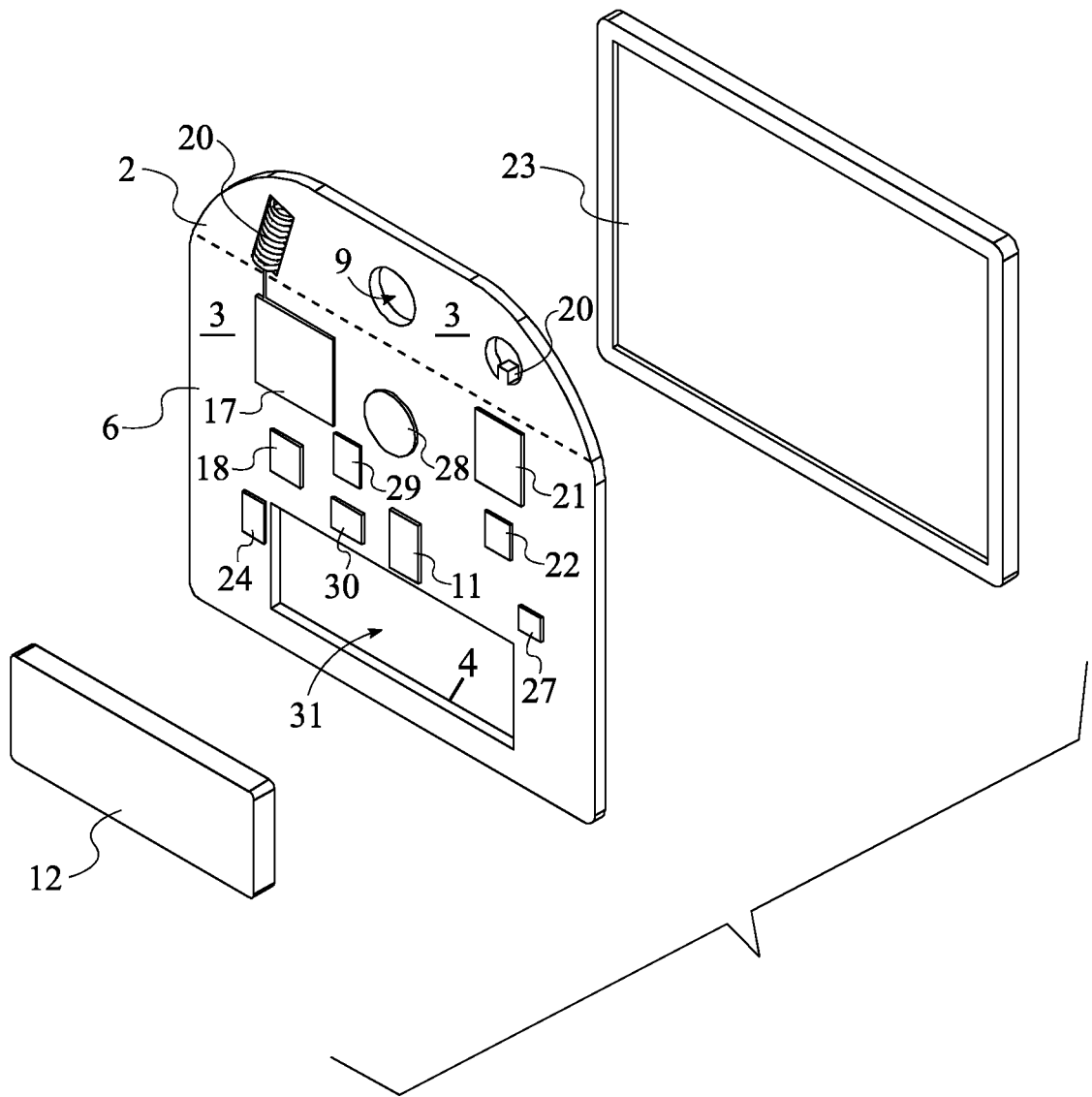
FIG. 5 is an exploded front perspective view of the present invention without the casing.

With reference to FIG. 5, the substrate 1 may further comprise a battery cutout 31 in order to support and contain the rechargeable battery 12. The battery cutout 31 traverses from the first face 3 of the bottom flat portion 6 to the second face 4 of the bottom flat portion 6. Further, the rechargeable battery 12 is positioned into the battery cutout 31, and the rechargeable battery 12 is connected onto the solar panel 23. Due to the substrate 1 being a thin structural board and to minimize the weight of the present invention, the battery cutout 31 is required in order to laterally support the rechargeable battery 12. Further, the rechargeable battery 12 is fully secured to the substrate 1 by being fixed to the solar panel 23.

Although the invention has been explained in relation to its preferred embodiment, it is to be understood that many other possible modifications and variations can be made without departing from the spirit and scope of the invention as hereinafter claimed.

What is claimed is:

1. An electronic ear tag for animal husbandry comprising:
a substrate;
a microcontroller;
a rechargeable battery;
a wireless communication module;
a global positioning system (GPS) module;
a solar panel;
the substrate comprising a top flat portion, a bottom flat portion, and an ear-attachment feature;
the top flat portion and the bottom flat portion each comprising a first face and a second face;
the ear-attachment feature being integrated into the top flat portion;
the rechargeable battery being mounted into the first face of the bottom flat portion;
the microcontroller being mounted onto the first face of the bottom flat portion;
the wireless communication module and the GPS module being integrated into the substrate;
the solar panel being mounted onto the second face of the bottom flat portion;
the substrate comprising a battery cutout;
the battery cutout penetrating the bottom flat portion by the battery cutout traversing from the first face of the bottom flat portion to the second face of the bottom flat portion;
the rechargeable battery being positioned into the battery cutout; and
the rechargeable battery being connected onto the solar panel by the rechargeable battery being fixed to the solar panel;
the solar panel being operatively coupled to the rechargeable battery, wherein the solar panel is used to recharge the rechargeable battery;
the rechargeable battery being electrically connected to the microcontroller, the wireless communication module, and the GPS module; and
the microcontroller being electronically connected to the wireless communication module and the GPS module.

2. The electronic ear tag for animal husbandry as claimed in claim 1 comprising:
a solar charge controller;
the solar charge controller being mounted to the first face of the bottom flat portion; and
the solar panel being electrically connected to the rechargeable battery through the solar charge controller.

3. The electronic ear tag for animal husbandry as claimed in claim 1 comprising:
a casing;
the substrate, the microcontroller, the rechargeable battery, the wireless communication module, and the GPS module being positioned within the casing;
the solar panel being positioned external to the casing; and
the casing being hermetically connected around the solar panel.

4. The electronic ear tag for animal husbandry as claimed in claim 3, wherein the casing is made of a thermoplastic elastomer material.

5. The electronic ear tag for animal husbandry as claimed in claim 1 comprising:
the GPS module comprising a GPS antenna and a GPS receiver;
the GPS antenna being integrated into the top flat portion; and
the GPS receiver being mounted onto the first face of the bottom flat portion.

6. The electronic ear tag for animal husbandry as claimed in claim 5 comprising:
the GPS module comprising a GPS power switch;
the GPS power switch being mounted onto the first face of the bottom flat portion; and
the rechargeable battery being electrically connected to the GPS receiver through the GPS power switch.

7. The electronic ear tag for animal husbandry as claimed in claim 1 comprising:
- the wireless communication module comprising a communication antenna and a communication transmitter;
- the communication antenna being integrated into the top flat portion;
- the communication transmitter being mounted onto the first face of the bottom flat portion; and
- the communication transmitter being positioned adjacent to the communication antenna.

8. The electronic ear tag for animal husbandry as claimed in claim 7 comprising:
- the wireless communication module comprising a communication power switch;
- the communication power switch being mounted onto the first face of the bottom flat portion; and
- the rechargeable battery being electrically connected to the communication transmitter through the communication power switch.

9. The electronic ear tag for animal husbandry as claimed in claim 7 comprising:
- the communication antenna comprising an elongated antenna body; and
- a central axis of the elongated antenna body being oriented at an acute angle with a sagittal plane of the substrate.

10. The electronic ear tag for animal husbandry as claimed in claim 1 comprising:
- at least one light;
- the at least one light being mounted onto the first face of the bottom flat portion;
- the at least one light being electrically connected to the rechargeable battery; and
- the at least one light being electronically connected to the microcontroller.

11. The electronic ear tag for animal husbandry as claimed in claim 1 comprising:
- a temperature sensor;
- the temperature sensor being mounted onto the first face of the bottom flat portion; and
- the temperature sensor being electronically connected to the microcontroller.

12. The electronic ear tag for animal husbandry as claimed in claim 1 comprising:
- an initialization circuit;
- an optical power switch;
- the initialization circuit and the optical power switch being mounted onto the first face of the bottom flat portion; and
- the initialization circuit being electrically connected to the rechargeable battery through the optical power switch.

* * * * *